United States Patent [19]

Elias et al.

[11] 4,438,513
[45] Mar. 20, 1984

[54] SHORT WAVELENGTH FREE ELECTRON LASER USING LOW ENERGY ELECTRONS

[75] Inventors: Luis R. Elias, Goleta; John M. J. Madey; Todd I. Smith, both of Palo Alto, all of Calif.

[73] Assignee: The United States of America as represented by the Secretary of the Navy, Washington, D.C.

[21] Appl. No.: 228,649

[22] Filed: Jan. 26, 1981

[51] Int. Cl.³ .............................................. H01S 3/00
[52] U.S. Cl. ........................................... 372/2; 372/74
[58] Field of Search ..................................... 372/2, 74

[56] References Cited

U.S. PATENT DOCUMENTS

| | | | |
|---|---|---|---|
| 3,822,410 | 7/1974 | Madey | 331/94.5 |
| 3,887,882 | 6/1975 | Smith | 331/94.5 P |
| 3,919,580 | 11/1975 | Mooney et al. | 313/310 |
| 3,963,994 | 6/1976 | Alger et al. | 331/94.5 PE |
| 4,041,415 | 8/1977 | Ault et al. | 331/94.5 PE |
| 4,047,125 | 9/1977 | Dreyfus | 331/94.5 PE |
| 4,077,017 | 2/1978 | Gilson et al. | 331/94.5 PE |
| 4,087,765 | 5/1978 | Edelstein et al. | 331/94.5 G |
| 4,126,833 | 11/1978 | Hundstad et al. | 331/94.5 PE |
| 4,162,432 | 7/1979 | Schlitt | 315/349 |
| 4,168,475 | 9/1979 | Schimitschek et al. | 331/94.5 G |
| 4,189,686 | 2/1980 | Brau et al. | 372/2 |

Primary Examiner—William L. Sikes
Assistant Examiner—Leon Scott, Jr.
Attorney, Agent, or Firm—R. F. Beers; Charles D. B. Curry; George L. Craig

[57] ABSTRACT

A method and apparatus for constructing a continuous wave (CW) free electron laser (FEL) system capable of providing tunable high power laser radiation at short wavelengths using low-energy recirculating DC electron beams. This method replaces the static periodic magnetic field used in conventional FEL systems with an equivalently intense and continuous electromagnetic pump field having spatial periodicity less than 1 cm. The pump field is generated by a low-energy recirculated DC electron beam interacting with a transverse static periodic magnetic field.

4 Claims, 4 Drawing Figures

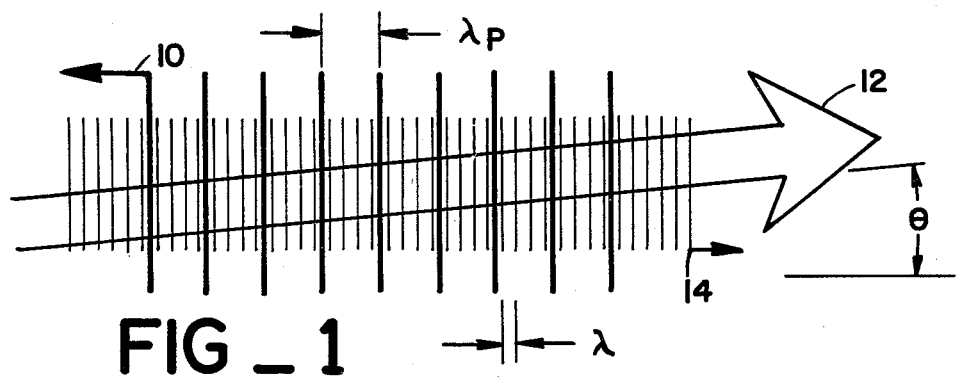
FIG_1
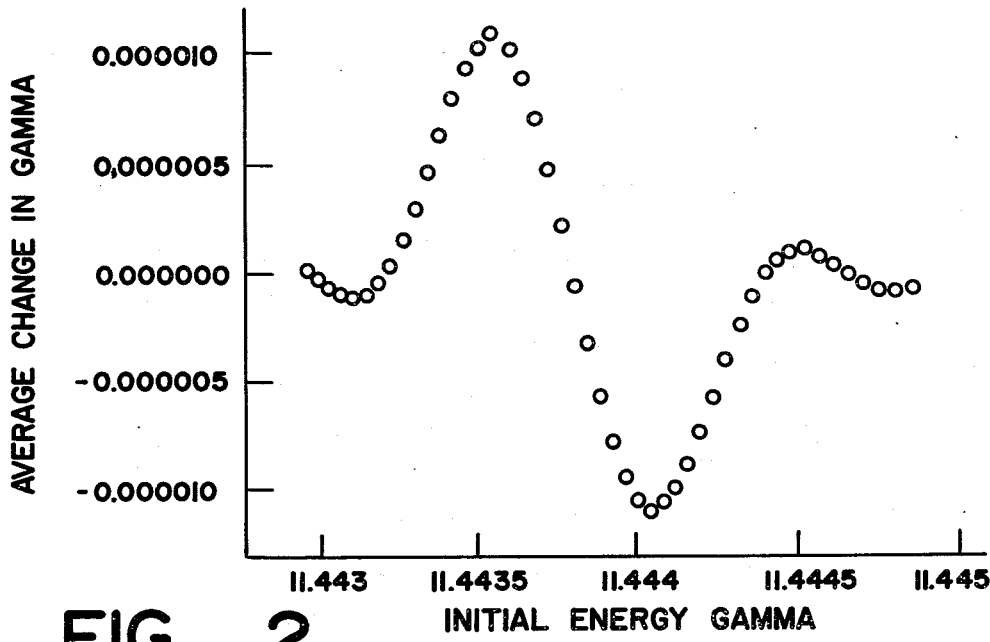
FIG_2
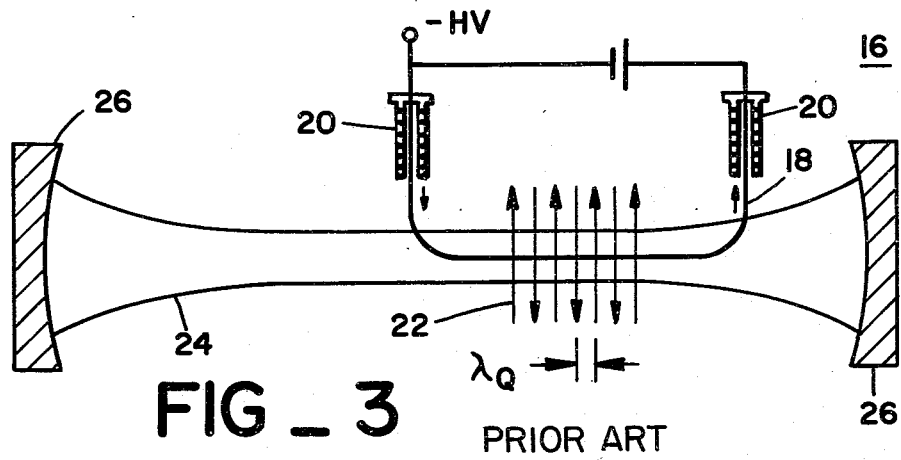
FIG_3 PRIOR ART

SHORT WAVELENGTH FREE ELECTRON LASER USING LOW ENERGY ELECTRONS

BACKGROUND OF THE INVENTION

1. Field of the Invention

This invention relates to a free electron laser (FEL) and more specifically to a FEL in which short wavelength laser radiation is produced using low-energy recirculating DC electron beams and in which a continuous electromagnetic pump field replaces the conventional static periodic magnetic field.

2. Description of the Prior Art

In a conventional FEL using static periodic magnetic fields the operating wavelength in the weak-field limit is given approximately by $$\lambda \approx (\lambda q/2\gamma^2) \qquad (1)$$

where
- $\lambda q$ = the period of the magnetic structure.
- $\gamma$ = electron energy measured in units of electron rest mass.

Using low energy electron beams, $E \leq 5$ MeV conventional FEL's are limited to operation at relatively long wavelengths since magnetic structures having spatial periodicity shorter than $\lambda q = 1$ cm are impractical to construct. Using high energy electron beams, conventional FEL's can operate at shorter wavelengths but radio frequency (RF) accelerators are necessary to produce the high electron energies.

The above limitations are avoided by the instant invention in which the proven technology of electrostatic accelerators is combined with low energy recirculating DC electron beams, to provide a continuous wave (CW) FEL having tunable high power laser radiation at short wavelength, e.g. $1000 \text{ Å} < \lambda < 50\mu$. This is achieved by replacing (2) the static periodic magnetic field used in conventional FEL's by an equivalent intense and continuous electromagnetic pump field having a spatial periodicity or wavelength, $\lambda p$, less than 1 centimeter. With a real pump electromagnetic field, the FEL output wavelength and the pump field wavelength are related in the weak field limit by the equation:

$$\lambda^*(\lambda p/4\gamma^2) \qquad (3)$$

Thus, for the same electron energy, $\gamma$, the real pump field yields shorter wavelength laser operation than the one obtained using a periodic magnetic structure.

Using low energy electron beams to produce short wavelength laser radiation has several practical advantages. First, the electron beams can be easily produced using the well understood and reliable technology of conventional electrostatic generators. Second, the quality of the emergent electron beams so produced by the electrostatic generators is excellent and practically all the electrons in the beam can participate in the wave amplification process. Third, the output electron beam can be decelerated, captured and re-accelerated to provide a fresh high quality electron beam which can be used repeatedly to produce high power optical radiation. Fourth, only a relatively low voltage DC power supply is required to replenish the energy lost by the electron beam, mostly due to laser radiation, and hence a FEL system operating with good efficiency is achieved. Finally, it is possible to generate continuous electron beams with electrostatic accelerators, hence, true CW operation of the laser can be achieved, as compared to the pulsed structure inherent in electron and laser beams produced by RF accelerators.

SUMMARY OF THE INVENTION

The present invention provides an apparatus and method for constructing a continuous wave FEL system capable of providing tunable high power laser radiation at short wavelengths using low-energy recirculating DC electron beams. The present invention replaces the static periodic magnetic field used in conventional FEL systems with an equivalently intense and continuous electromagnetic pump field having spatial periodicity less than 1 cm. The pump field is generated by a low-energy recirculated DC electron beam interacting with a transverse static periodic magnetic field.

A primary object of invention is to provide a continuous wave tunable high power FEL system.

Another object of invention is to provide a tunable high power FEL system using low energy recirculating electron beams.

Yet another object of invention is to provide a tunable high power FEL system using low energy recirculating electron beams and having an electromagnetic pump field instead of a static periodic magnetic pump field.

Other objects, advantages and novel features of the invention will become apparent from the following detailed description of the invention when considered in conjunction with the accompanying drawings.

BRIEF DESCRIPTION OF THE DRAWINGS

FIG. 1 is a schematic drawing illustrating the interaction geometry of a short wavelength, low electron energy FEL.

FIG. 2 is a plot of the amount of energy gained by a single electron during the interaction process.

FIG. 3 is a schematic drawing illustrating a means for obtaining an intense laser pump wave.

DESCRIPTION OF THE PREFERRED EMBODIMENT

Figure 4:
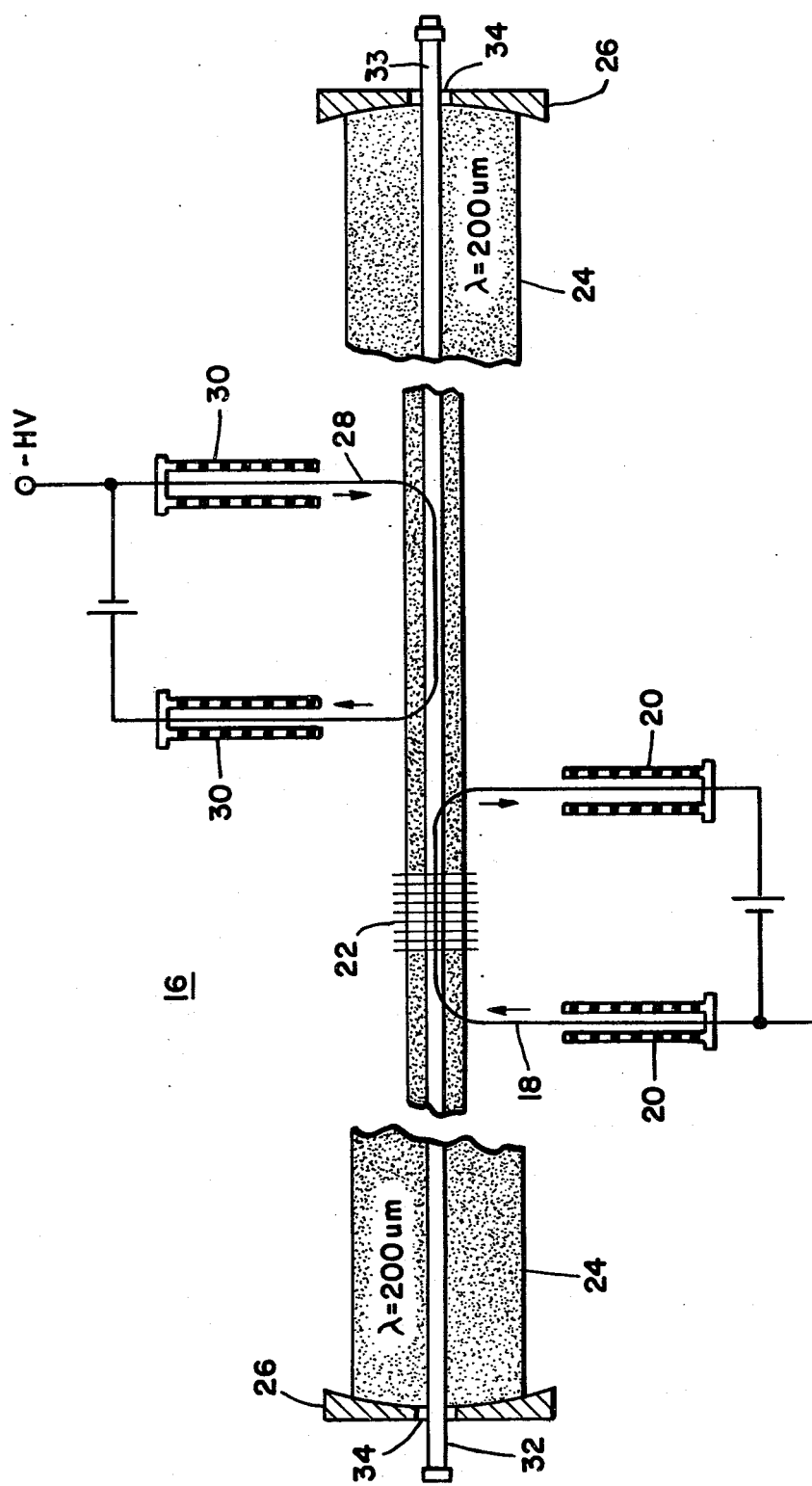
FIG. 4 is a schematic drawing illustrating the short wavelength, low electron energy FEL using electrostatic electron accelerators.

Referring to FIG. 1, the interaction geometry of two processes occurring simultaneously in a FEL is shown. First, a pump wave 10 of period $\lambda p$ induces a periodic transverse velocity modulation to a monochromatic beam of electrons 12 having energy $\gamma mc^2$ traveling in a direction opposite the pump wave 10. Simultaneously, the electric and magnetic fields of a transverse optical field 14, the input wave, traveling in the same direction as the electron beam 12 can couple to the velocity modulated electron beam 12 via the Lorentz force. Under the proper phase matching conditions between the pump wave 10, the velocity modulated electron beam 12 and the input wave 14, kinetic energy can be transferred from the electron beam 12 to the input wave 14 causing wave amplification or stimulated emission. The condition for wave amplification occurs when the electron energy is slightly larger than the resonance energy $\gamma_r$ given by $$\gamma_r^2 = \frac{\lambda_p + \lambda}{4\lambda}\left[1 + \frac{(\gamma\theta)^2}{2} + \left(\frac{\lambda_p e B_p}{2\pi mc^2}\right)^2\right] \quad (4)$$

where $\theta$ = angle between the electron's drift velocity and the direction of propagation of the input wave 14.

$B_p$ = the RMS value of the magnetic field of the pump wave 10.

In the process of wave amplification or stimulated emission the initial energy of the electron beam 12 is reduced by an amount that depends on $B_p$, $\lambda_p$, $\lambda$, $\gamma$, not all independent variables, as well as on the number of periods of the pump wave 10 in the interaction region and the optical power density S of the input wave 14. Referring to FIG. 2, the dependence of optical power gain versus initial electron energy for a FEL operation according to the present invention is shown. By way of example and not limitation, the parameters for this particular plot were:

$\lambda = 4000$ Å
$\lambda_p = 400$ μm
electron energy = 5 MeV.

The plot shows the actual amount of energy gained by a single electron during the interaction process. For a continuous beam of electrons the actual optical power gain may be expressed by $$\frac{\Delta P}{P} = -\frac{(\Delta\gamma) mc^2 I}{sAe} \quad (5)$$

where $\Delta\gamma$ = (final electron energy-initial electron energy)/$mc^2$. The plot represents the numerical integration of the Lorentz force equation and, in the cited example where saturation occurs, $S \approx 10^6$ watts/cm$^2$, the power extracted from the electron beam 12 is approximately 200 watts/amp CW. Fifty amperes of electron beam current is required to operate above threshold and with this current the amount of laser power that can be extracted is 10 Kw CW.

The theoretical small signal optical power gain of a FEL is expressed by $$g \propto I \frac{\lambda_p^4 N^3}{\gamma^3} \quad (6)$$

with the additional phase matching constraint given by $$\lambda = \frac{\lambda_p}{4\gamma^2}\left[1 + \frac{(\gamma\theta)^2}{2} + \left(\frac{\lambda_p e B_p}{2\pi mc^2}\right)^2\right] \quad (7)$$

The gain decreases with wavelength, but with large valves of electron beam current sufficient gain is available to operate this type of laser down to wavelengths in the vacuum ultraviolet region.

For efficient operation of the laser of the present invention, the amount of electrical power required to produce the intense optical pump wave should be smaller than the amount of power extracted from the short wavelength laser. There is no conventional laser that can generate the required pump power density, $S_n \degree 10^8$–$10^9$ watts/cm$^2$, on a continuous basis with low input power. However, the conventional FEL using static periodic magnetic fields is an ideal source of far infrared radiation and such a FEL having a very high Q cavity can provide sufficient pump laser power to enable operation of the short wavelength laser with reasonable overall efficiency.

Referring to FIG. 3, a schematic of a conventional FEL used to provide the intense optical pump wave is shown. A high Q optical cavity resonator 16 is shown in which a beam of low energy electrons 18, e.g. E≦5 MeV, is generated along the optical axis of the resonator by a pair of electrostatic generators 20. The electron beam passes through and interacts with a transverse static periodic magnetic field 22 so as to generate an intense electromagnetic pump field 24 that is reflected along the optical axis between two highly reflective water cooled copper mirrors 26. For high efficiency the electron beam 18 is recycled and only the amount of power lost to the electromagnetic pump field 24 has to be supplied to the electron beam 18 by the electrostatic accelerators 20. Although 5 MeV represents an ideal, cheap electron beam power level, the actual range is 5 MeV to about 30 MeV with current technology practically limiting operation to 20-25 MeV. It is possible in principle to vary the power level if other operational parameters are met.

FIG. 4 shows a complete schematic of a short wavelength, low electron energy FEL according to the present invention. In a laser cavity resonator 16, first a low-energy recirculated electron beam 18 is generated by a first pair of electrostatic accelerators 20 and directed along the optical axis of the cavity 16 through a transverse static periodic magnetic field 22 thereby inducing an intense electromagnetic pump field 24 that reflects along the optical axis between two watercooled highly reflective copper mirrors 26. A second low-energy recirculated electron beam 28 generated by a second pair of electrostatic generators 30 and also directed along the optical axis of the cavity 16 interacts with the pump field 24 and the optical input wave 32 to amplify the input wave at 4000 Å and therefore produce short wavelength high energy laser radiation 33 along the optical axis that may be extracted from the cavity for example by means of a an aperture 34 in a partially transmitting mirror 26 at optical operating wavelengths aligned with the cavity optical axis. The short-wavelength high-energy laser radiation may also be extracted by coating the inner reflecting surface of the mirrors with selectively transmitting dialectric films permitting the high energy radiation to exit the cavity along the optical axis. Yet another method of extracting the energy would be to deposit a copper film over a glass blank forming the mirrors 26 such that a clear glass surface free of the film exists at the optical axis permitting extraction.

The FEL has an intrinsic homogeneously broadened spectrum whose fractional width is approximately $(\Delta\lambda/\lambda)_{Hom.} = 1/N$ where N is the number of pump periods in the interaction region. From the phase matching constraint equation it is possible to derive the requirements for the electron beam characteristics that will guarantee a homogeneously broadened lineshape, $\Delta\lambda < \lambda/N$. The requirements are expressed as follows:

(a) Electron beam homogeneity is expressed by $$\Delta\lambda = \frac{\partial\lambda}{\partial\gamma}\bigg|_{B,\theta=0}\Delta\gamma \leq \frac{\lambda}{N} \to \frac{\Delta\gamma}{\gamma} \leq \frac{1}{2N} \quad (8)$$

(b) Electron beam maximum divergence is expressed by $$\Delta\lambda = \frac{\partial\lambda}{\partial\theta}\bigg|_{\gamma,B}\theta \leq \frac{\lambda}{N} \to \theta \leq \sqrt{\frac{4\lambda}{N\lambda_p}} \quad (9)$$

(c) Electron beam transverse dimensions are expressed by $$\Delta\lambda = \frac{\partial\lambda}{\partial B}\bigg|_{\gamma,\theta=0}\Delta B \to \frac{\Delta B}{B} \leq \frac{1}{2N}\left(\frac{2\pi mc^2}{\lambda_p e B_p}\right)^2 \quad (10)$$

where $B \alpha B_o e^{-r/\omega_o}$ and is the magnetic field for the pump wave (11)

$\omega_o$ is the gaussian beam waist r is the radial distance from the gaussian mode axis.

The constraint on the magnetic field variation requires:

$$\frac{\Delta r}{\omega_o} = -\frac{\Delta B}{B} \leq \frac{1}{2N}\left(\frac{2\pi mc^2}{\lambda_p e B}\right)^2 \quad (12)$$

An example of a typical short wavelength high energy FEL according to the instant invention is given below although the invention is by no means limited to the example.

Where $\lambda = 4000$ Å, $\gamma = 10$, $\lambda_p = 200$ μm, $B = 0.2$ T, and $N = 10,000$ the electron beam requirements according to the equations given above are $$\frac{\Delta\gamma}{\gamma} \leq 5 \times 10^{-5} \quad (a)$$

$$\theta \leq 0.9 \times 10^{-3} \text{ radians} \quad (b)$$

$$\frac{\Delta r}{\omega_o} \leq 7.18 \quad (c)$$

Additionally, even though electrostatic accelerators can be constructed having very good electron energy homogeneity, gain expansion techniques may be applied to meet beam emittance constraints with no great difficulty.

Assuming a 1 cm pump wave gaussium beam waist, the emittance requirement for the example discussed above would be:

Emittance $\leq \pi r\theta = \pi 10$ (mm) (mrad), an easily attainable figure for electrostatic accelerators.

The present invention therefore permits the use of low-energy recirculated electrons to provide a short-wavelength, high-power, continuous FEL.

What is claimed is:

1. A continuously tunable apparatus for the production of intense coherent optical radiation comprising:
   (a) a laser cavity resonator, said resonator having a longitudinal optical axis and two opposed mirrors aligned at opposite ends of said axis to reflect radiation generated in said resonator;
   (b) means for producing a first DC velocity modulated electron beam and directing said first electron beam along said axis of said resonator;
   (c) means for establishing a static periodic magnetic field uniformly transverse to and symmetric about a portion of said axis of said cavity resonator and through which said first DC velocity modulated electron beam passes, said first DC velocity modulated electron beam and said static periodic magnetic field interacting to produce a tunable intense continuous electromagnetic pump field oscillating between said mirrors and along said optical axis of said cavity.

2. An apparatus as recited in claim 1 having interacting means which include:
   (a) means for generating a second DC velocity modulated electron beam and directing said second electron beam opposite said intense electromagnetic pump field along said optical axis of said cavity resonator; and
   (b) means for providing an optical input wave introduced along said axis of said cavity resonator in the same direction as said second DC velocity modulated electron beam whereby said intense electromagnetic pump field, said second DC velocity modulated electron beam and said optical wave interact to produce stimulated emission of short wavelength high energy optical radiation by said optical wave at a predetermined frequency wherein said optical radiation may be extracted via transmitting apertures in said mirrors.

3. An apparatus as recited in claim 2 wherein said generating means includes a second pair of electrostatic accelerators operably connected such that said second DC velocity modulated electron beam is a low-energy recirculated electron beam.

4. An apparatus as recited in claim 1 wherein said producing means includes a pair of electrostatic accelerators operably connected such that said first DC velocity modulated electron beam is a low-energy recirculated electron beam.

* * * * *